United States Patent [19]
Iwatani et al.

[11] Patent Number: 4,739,243
[45] Date of Patent: Apr. 19, 1988

[54] STARTUP PERIOD CONTROL DEVICE FOR VEHICLE GENERATOR

[75] Inventors: Shiro Iwatani; Mitsuharu Morishita; Keiichi Komurasaki, all of Himeji, Japan

[73] Assignee: Mitsubishi Denki Kabushiki Kaisha, Tokyo, Japan

[21] Appl. No.: 923,982

[22] Filed: Oct. 28, 1986

[30] Foreign Application Priority Data

Oct. 29, 1985 [JP] Japan .................................. 60-244553

[51] Int. Cl.$^4$ ............................................. H02J 7/14
[52] U.S. Cl. ......................................... 322/10; 322/28; 322/29; 322/33
[58] Field of Search ....................... 322/28, 29, 32, 99, 322/33, 10, 11; 320/64

[56] References Cited
U.S. PATENT DOCUMENTS

| | | | |
|---|---|---|---|
| 4,470,003 | 9/1984 | Mitchell | 322/28 X |
| 4,570,199 | 2/1986 | Morishita et al. | 322/28 X |
| 4,629,967 | 12/1986 | Voss | 322/33 X |
| 4,634,954 | 1/1987 | Kato et al. | 322/29 X |

*Primary Examiner*—R. J. Hickey
*Attorney, Agent, or Firm*—Sughrue, Mion, Zinn, Macpeak and Seas

[57] ABSTRACT

The output current and drive torque characteristics of a vehicle generator during cold, startup periods are approximated to those of a warmed up generator by sensing the field winding current, and interrupting it for a time period prolonged by a feedback/charging capacitor (904) whenever it exceeds a reference level. The field winding current never exceeds the reference level when the generator is warmed up, whereupon the interrupting circuitry has no effect.

3 Claims, 3 Drawing Sheets

STARTUP PERIOD CONTROL DEVICE FOR VEHICLE GENERATOR

BACKGROUND OF THE INVENTION

This invention relates to a control device for a vehicle mounted a.c. generator, and particularly to such a control device capable of regulating the field current and drive torque characteristics of the generator in an initial stage of its operation such that these characteristics are made to approximate those obtainable when the generator operation is steady.

FIG. 1 shows a circuit diagram of a conventional control device of this type, which comprises an a.c. generator 1 driven by the vehicle engine, a fullwave rectifier 2 for rectifying the output voltage of the generator, and a voltage regulator 3 for regulating the rectified output voltage to a predetermined value. The generator 1 includes an armature winding 101 and a field winding 102. The rectifier 2 has a main output terminal 201, an output terminal 202 connected to the field winding 102 and to the voltage regulator 3, and a third output terminal 203 which is grounded. The regulator 3 includes series connected resistors 301 and 302 which constitute a voltage divider for dividing the voltage at the output terminal 202 of the rectifier 2, a Zener diode 303 for detecting the junction voltage of the divider, which is a fraction of the output voltage at terminal 202 of the rectifier 2, so as to be turned on when the detected voltage exceeds a predetermined value, a transistor 304 which is turned on when the Zener diode 303 turns on, an output transistor 305 which is controlled by the transistor 304 to on-off control the current supply to the field winding 102 of the generator 1, a resistor 306 connected to a base of the output transistor 305, and a diode 307 connected in parallel to the field winding 102 for absorbing on-off surges produced in the field winding 102.

In the same figure, numerals 4, 5, 6, 7 and 8 depict a vehicle mounted battery, various electrical loads of the vehicle, a key switch of the vehicle, a resistor for energizing the field winding 102 of the generator at the start time of the generator operation, and a reverse current blocking diode, respectively.

The output current and drive torque characteristics of the generator in FIG. 1 when it is operating with a maximum load condition are shown in FIG. 2, in which the dotted curves show the current and torque when the generator is cold, i.e., in an initial stage of operation, and solid curves show them when the generator is hot, i.e., warmed up and operating steadily.

In operation, when the key switch 6 is closed to start the engine (not shown), an initial field current flows from the battery 4 through the switch 6, the resistor 7 and the diode 8 to the field winding 102 of the generator 1, and the latter is enabled to generate power. Then, when the engine starts to rotate, the generator 1 is rotated to thereby generate an output voltage which is rectified by the rectifier 2 and supplied from the output terminal 202 to the voltage regulator 3 and the divider 301, 302. When the fraction of the rectified voltage from the divider exceeds the predetermined value which is determined by the resistors 301 and 302 and the Zener diode 303, the transistor 304 is turned on.

On the other hand, when the fraction is below the predetermined value, the Zener diode 303 and thus the transistor 304 remain turned off.

The output transistor 305 is on-off controlled by the transistor 304 to thereby on-off control the field current flowing through the field winding 102 of the generator such that the output voltage of the generator is regulated to a predetermined value.

The voltage regulator 3 performs the above mentioned operations regardless of the condition of the generator, so that the generator 1 supplies the regulated output voltage through the output terminal 201 of the rectifier 2 to the battery 4 and the various electrical loads of the vehicle, which are depicted by reference numeral 5.

As will be clear from FIG. 2, in the cold state of the generator which is immediately after startup, the output current of the generator gradually increases with rotational speed as shown by the dotted line and, when it is heated by itself and by an increasing ambient temperature and becomes hot, the curve is gradually reduced to that shown by the solid line. The nominal power of the generator is generally determined according to the characteristics thereof in a hot state. That is, the differences between the output characteristic curves of the generator in a cold state and in a hot state represent a mere margin for assuring the hot state characteristics and, therefore, such margin should ideally be removed.

As to the drive torque which is determined by the magnetomotive force generated by the field current, and which increases rapidly and then decreases with the rotational speed of the generator, it is maximum in the cold state and gradually decreased to the solid curve with increase in temperature. The drive torque of the generator corresponds to the additional mechanical torque to be generated by the vehicle engine. That is, there is a difference in drive torque between the cold state and the hot state, which affects the engine as an extra load. Particularly, since immediately after the engine starts, the torque of the engine is relatively stable and the drive torque of the engine is generally high in the cold state, the latter torque influences the engine operation such that the smoothness of the engine rotation is degraded and fuel consumption is increased. These problems are usually amplified when the engine is very cold.

It might be possible to on-off control the field current by detecting the latter and cutting off the output transistor of the voltage regulator directly when the detected value is higher than a predetermined value so that the field current is cut off when such a situation occurs, as disclosed in U.S. Pat. No. 4,570,199 issued to Morishita et al, two of whom are co-inventors of this application. However, such a system is only suitable when the field current is suddenly and abnormally increased, such as by a short-circuit of the field winding.

SUMMARY OF THE INVENTION

This invention overcomes the problems mentioned above by providing a control device for a vehicle mounted generator, which is capable of restricting the drive torque of the generator in the cold state without degrading its nominal output power. The restriction of the drive torque is realized, according to the invention, by reducing the magnetomotive force of the field winding during the cold period of the generator in which the field current is considerably large although not abnormal.

The control device according to the invention comprises a field current detector having a detecting element adapted to detect the current flowing through the field winding of the generator. The field current detector responds to an output of the detecting element to provide a control output upon which the field current of the generator in the cold state is restricted to a certain constant value.

The field current detector on-off controls an input transistor of the voltage regulator to thereby on-off control an output transistor thereof only when the field current is not less than a certain constant value while exceeding that of a normal value obtainable in the hot state, so that an average field current in the cold state is controlled to a predetermined constant value, causing the output current and the drive torque of the generator in the cold state to be suitably restricted.

DETAILED DESCRIPTION OF THE PREFERRED EMBODIMENT

Figure 1:
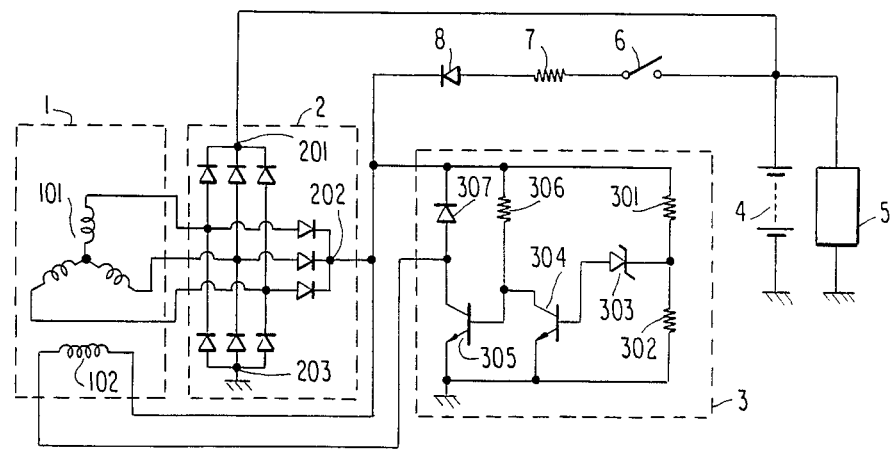
FIG. 1 is a circuit diagram of a conventional control device of a vehicle mounted a.c. generator.
Figure 2:
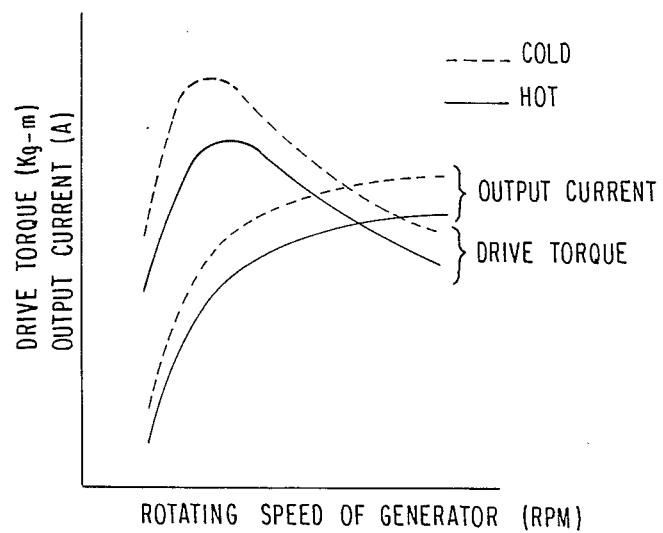
FIG. 2 shows characteristic curves of the generator in FIG. 1.
Figure 3:
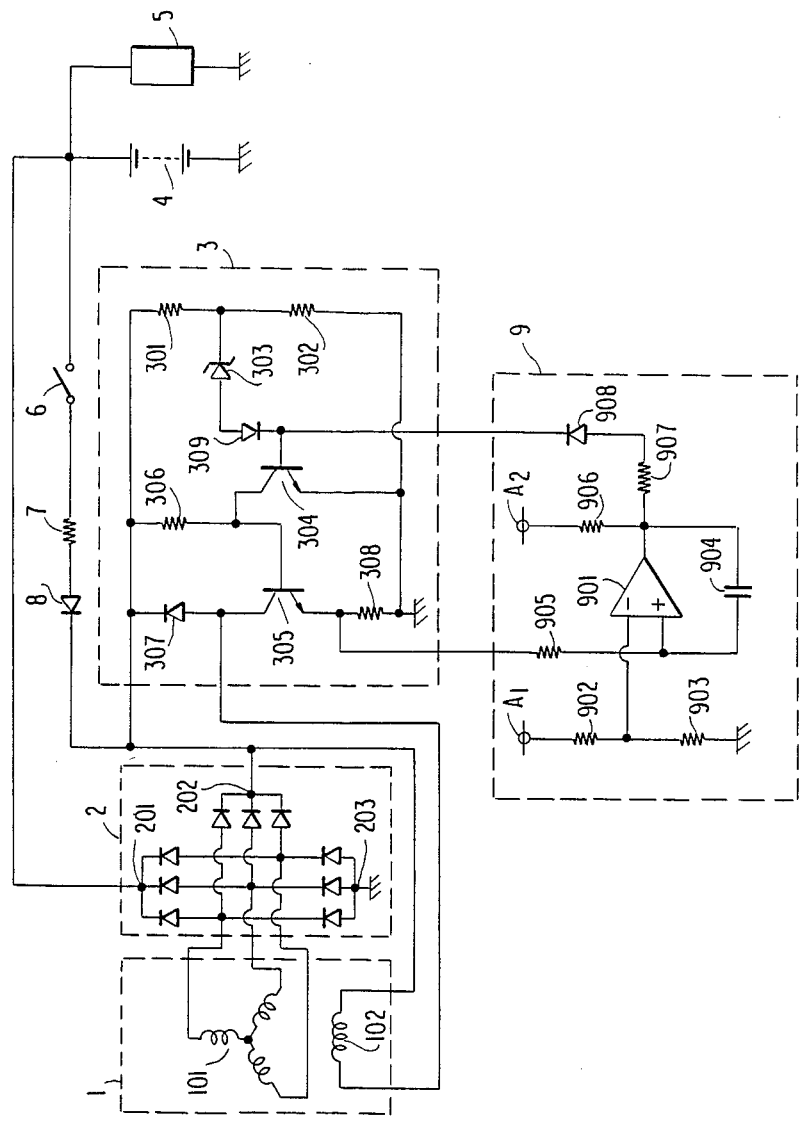
FIG. 3 is a circuit diagram of an embodiment of a control device according to the invention.

An embodiment of the invention is shown in FIG. 3 which differs from the conventional circuit shown in FIG. 1 in that a diode 309 is added between the anode of the Zener diode 303 and the base of the input transistor 304 of the voltage regulator 3 to block a reverse current, a resistor 308 having a small value, e.g., several tens of milliohms, is connected in series with the field winding 102 of the generator 1 to detect the field current, and a field current detector 9 is added to the voltage regulator. Since the other constructive features are the same as those of the conventional circuit shown in FIG. 1, detailed descriptions thereof are omitted to avoid duplication.

In FIG. 3, the field current detector 9 comprises a voltage divider composed of series connected resistors 902 and 903, which has one end connected to a constant voltage source $A_1$ and the other end grounded, and a comparator 901 having an inverted input connected to a junction point of the divider and a non-inverted input connected through a resistor 905 to an emitter of the output transistor 305 of the voltage regulator 3 and through a capacitor 904 to an output thereof. The junction point voltage is used as a reference voltage for the comparator 901.

The output of the comparator 901 is connected through a current limiting resistor 906 to another constant voltage source $A_2$ and through a resistor 907 and a reverse current blocking diode 908 to a base of the input transistor 304 of the voltage regulator 3. The resistor 905 determines the charging time constant of the capacitor 904.

Figure 4:
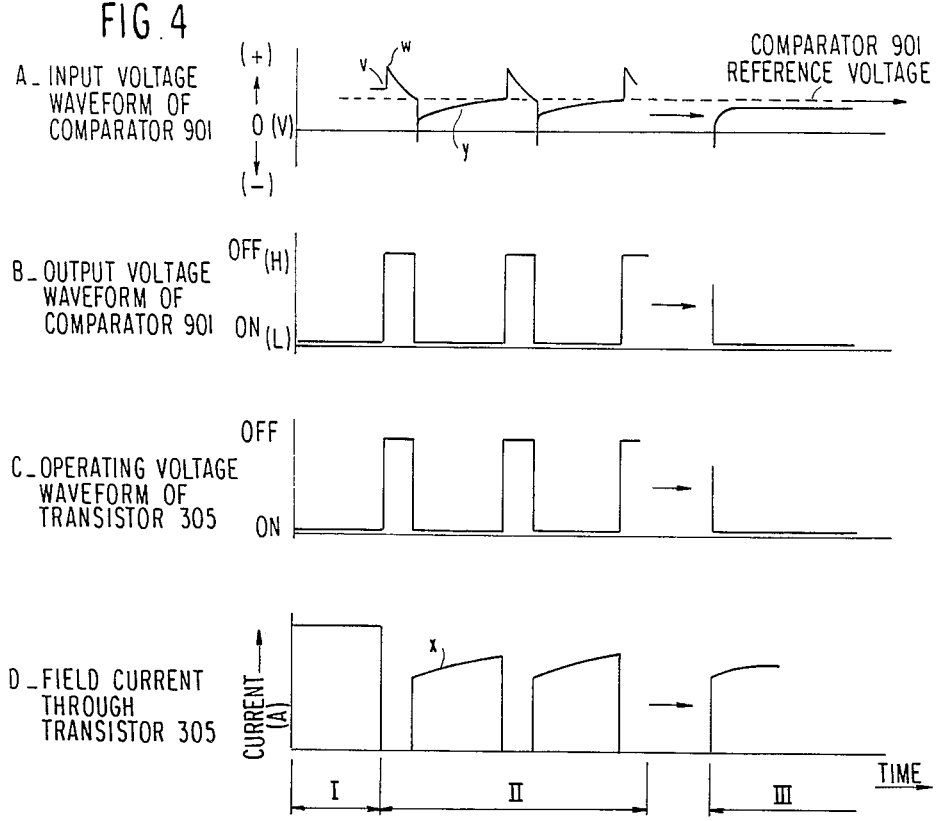
FIG. 4 shows voltage waveforms at various points of the embodiment shown in FIG. 3.

FIG. 4 shows voltage waveforms at various circuit points of the field current detector 9 when the generator 1 is loaded maximally, in which waveform A is the input voltage at the non-inverted input of the comparator 901, with the reference voltage applied to the inverted input thereof being indicated by a dotted line, waveform B is the output voltage of the comparator 901, waveform C is the operating voltage of the output transistor 305 of the voltage regulator 3, and waveform D is the field current flowing through the output transistor 305 of the voltage regulator. In FIG. 4, time period I corresponds to a case where there is no field current detector 9 and the generator is in a cold state, time period II corresponds to a case where the field current detector 9 is provided while the generator is in the cold state, and time period III corresponds to a case where the generator is hot and runs stably.

Figure 5:
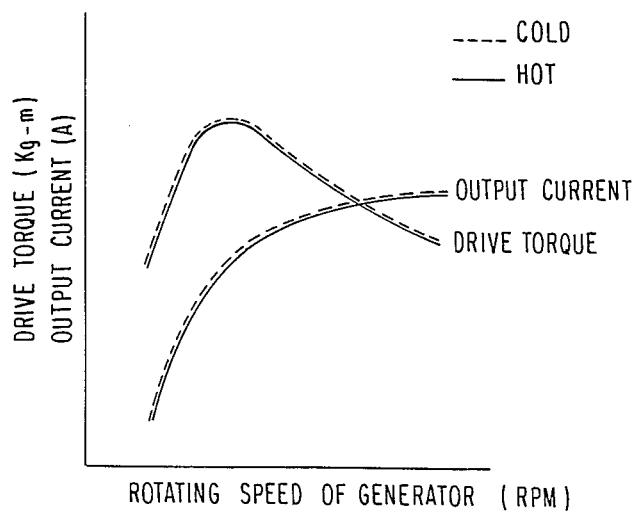
FIG. 5 shows characteristic curves of the generator shown in FIG. 3.

FIG. 5 shows plots of the output current and drive torque of the generator under a maximum load with respect to rotational speed. The cold generator curves are shown by dotted lines, and the hot generator curves are shown by solid lines.

In the operation of the device shown in FIG. 3, it is assumed that the generator 1 is operating with a maximum load. When a field current flows through the field winding 102, a voltage drop is produced across the resistor 308, which is proportional to the field current. A potential corresponding to the voltage drop is applied through the resistor 905 to the non-inverted input of the comparator 901 of the field current detector 9.

When the field current is small and the potential applied to the non-inverted input of the comparator 901 is lower than the reference voltage applied to the inverted input thereof, the output of the comparator 901 takes a low level "L" and, therefore, due to the reverse current blocking diode 908, the voltage regulator 3 is not affected by the existence of the field current detector 9 and operates on the basis of its own criteria.

On the other hand, when the field current is large enough to make the potential at the resistor 905 higher than the reference voltage of the comparator 901, the output thereof is switched to a high level "H". Upon the switching of the output of the comparator 901 from the "L" level to the "H" level, a base current is supplied from the constant voltage source $A_2$ through the resistors 906 and 907 and the diode 908 to the base of the input transistor 304 of the voltage regulator 3 to cause the latter transistor to turn on and thus the output transistor 305 to turn off, to thereby cut off the field current.

However, since the potential at the field current detecting resistor 308 is lowered simultaneously upon the termination of the field current, the output of the comparator 901 changes its state to the "L" level immediately. Thus, the output of the comparator 901 may repeat the switching operation between the two levels at a relatively high frequency, causing the whole operation of the generator system to be unstable.

The capacitor 904 eliminates this problem. That is, the capacitor 904 is charged from the constant voltage source $A_2$ through a charging circuit including the resistor 906, the capacitor 904 and the resistors 905 and 308 simultaneously with the switching of the output of the comparator 901 from the "L" level to the "H" level. Therefore, the potential of the non-inverted input of the comparator 901 rises momentarily and then reduces gradually at a rate determined by the time constant of the charging circuit. That is, the charging circuit constitutes a feedback circuit functioning to elongate the time period during which the output of the comparator 901 is maintained in the "H" level, to thereby lower the switching frequency of the comparator output. With the lowered switching frequency of the comparator output, the operation of the whole system can be stabilized.

The above operation may be better understood by referring to FIG. 4. Without the field current detector 9, when the generator 1 and hence the field winding 102 are cold, the field current flowing through the output transistor 305 is relatively large as shown by waveform D in period I.

Assuming that the field current detector 9 is present in such a situation, i.e., the system is operating in period II, and that the potential at the non-inverted input of the comparator 901 is higher than the reference voltage at the inverted input thereof as shown by a letter v on waveform A, the output of the comparator 901 becomes "H" as shown by waveform B and therefore the output transistor 305 is turned off to cut off the field current. At the same time, the potential level of the non-inverted input of the comparator 901 is raised to a level shown by a letter w on waveform A due to the feedback circuit of the capacitor 904. Then, it is lowered gradually at a rate determined by the charging time constant to a level below the reference level. When the potential curve passes through the reference level, the output of the comparator 901 is switched to the "L" level as shown by waveform B, resulting in the "H" level time period being increased.

The output transistor 305 is turned on at the end of the "H" time period to allow the field current to flow as shown by waveforms C and D in time period II. The current flowing through the field winding 102, which is an inductor having a time constant, increases gradually at a rate determined by the time constant of the inductor as shown by letter x on waveform D and the potential at the non-inverted input of the comparator 901 increases correspondingly as shown by letter y on waveform A. When the non-inverted input potential of the comparator 901 increases beyond the reference level, the output thereof becomes "H" again. By repeating the above mentioned operations, the average field current is regulated to a predetermined value.

When the generator 1 becomes hot and the field current thereof becomes normal in time period III, the potential at the non-inverted input of the comparator 901 falls below the reference level and the output thereof is maintained in the "L" level in which the field current detector 9 is disregarded by the voltage regulator 3.

As described, when the generator is cold and the field current is large, the field current detector 9 on-off controls the voltage regulator 3 to on-off control the current of the field winding 102 to thereby regulate the average value of the field current, while, when the generator is hot and the field current is stabilized, the on-off control of the voltage regulator by the field current detector 9 is terminated to allow the voltage regulator to regulate the generator output in a conventional manner.

The invention has been described with reference to the generator operating with a maximum load. When the generator is cold and the electrical load of the vehicle is small, the output voltage of the generator increases when the output of the comparator is at the "L" level, so that the Zener diode 303 of the voltage regulator 3 is turned on and hence the input transistor 304 is turned on to cut off the field winding to thereby regulate the output voltage to the predetermined value.

The invention thus recognizes that the output current of the generator and the driving torque thereof are determined by the magnetomotive force of the field winding, and that it is possible to regulate the output current and the drive torque by regulating the current flowing through the field winding. The field current is relatively large when the generator is cold and the resistance of the field winding is small, as mentioned previously, and reaches a normal, smaller value when the generator becomes hot and the resistance of the field winding increases.

According to the invention, it is thus possible to restrict the average value of the field current, which is large when the generator is cold, to a value substantially equal to that when the generator is hot, so that the output current and the drive torque are made equal to their values when the generator is hot as shown by the characteristic curves in FIG. 5.

It would also be possible to regulate the output current and drive torque of the generator in the cold state arbitrarily, for example, to those in between the values in the cold state and those in the hot state, respectively.

Since, according to the invention, it is possible to restrict the field current when the generator is cold, it becomes possible to restrict the output current and the drive torque thereof so that the load on the engine to drive the generator is reduced without degrading the nominal power of the generator and thus the engine rotation is stabilized with an improvement in fuel economy.

What is claimed is:

1. A control device for reducing a torque to be generated by an engine of a vehicle to drive a vehicle mounted a.c. generator (1) in at least a starting period of said engine, said generator being equipped with a rectifier (2) and a semiconductor voltage regulator (3) having an input transistor (304) and an output transistor (305) connected in series with a field winding (102) of said generator, comprising:
   (a) a field current detecting means (308) responsive to a field current flowing through said output transistor of said voltage regulator to provide a voltage output corresponding thereto,
   (b) a first constant voltage source (A1, 902, 903),
   (c) a comparator (901) having an input terminal supplied with said voltage output from the detecting means and a reference terminal supplied with a reference voltage from said first constant voltage source, said comparator being responsive to said output voltage of said field current detecting means to provide an output signal when said output voltage of said field current detecting means is higher than said reference voltage,
   (d) a second constant voltage source (A2),
   (e) means (908) responsive to said output signal of said comparator for supplying a current from said second constant voltage source to a base of said input transistor of said voltage regulator to turn it on to thereby turn said output transistor off when said output voltage of said field current detecting means is higher than said reference voltage; and
   (f) a feedback means connected to said comparator for prolonging the duration of said output signal therefrom after the output voltage of said field current detecting means falls below said reference voltage, to thereby reduce a switching frequency of said comparator output signal.

2. The control device as claimed in claim 1, wherein said feedback means comprises a capacitor (904), said capacitor being charged by said second constant voltage source to raise a potential at said input terminal of said comparator when said output transistor is turned on and to hold it above said reference voltage for a time determined by a time constant thereof.

3. The control device as claimed in claim 2, wherein said means responsive to said output signal of said comparator comprises a current limiting resistor (907) connected to an output terminal of said comparator and a reverse current blocking diode having a cathode connected to said base of said input transistor of said voltage regulator and an anode connected to said current limiting resistor.

* * * * *